United States Patent
Isambart et al.

(10) Patent No.: US 7,768,937 B2
(45) Date of Patent: Aug. 3, 2010

(54) VIDEO QUALITY ASSESSMENT

(75) Inventors: Marc Isambart, Ipswich (GB); Simon Broom, Ipswich (GB)

(73) Assignee: Psytechnics Limited (GB)

( * ) Notice: Subject to any disclaimer, the term of this patent is extended or adjusted under 35 U.S.C. 154(b) by 800 days.

(21) Appl. No.: 11/441,802

(22) Filed: May 26, 2006

(65) Prior Publication Data

US 2007/0133608 A1 Jun. 14, 2007

(30) Foreign Application Priority Data

May 27, 2005 (EP) .................................. 05253284

(51) Int. Cl.
H04L 12/28 (2006.01)
H04L 12/26 (2006.01)
H04L 12/56 (2006.01)
H04J 1/00 (2006.01)

(52) U.S. Cl. ........................ 370/252; 370/253; 370/248; 370/484; 370/395.21; 370/395.2

(58) Field of Classification Search ................. 370/252, 370/253, 248, 484, 224, 254, 395.21, 395.2
See application file for complete search history.

(56) References Cited

FOREIGN PATENT DOCUMENTS

EP 1443497 8/2004
EP 1530200 5/2005

OTHER PUBLICATIONS

Hazboun, "MPEG Stream Encapsulation Into RTP Packets", Sep. 1998, Lucent, all pages.*
Hoffman, "RTP Payload Format for MPEG1/MPEG2 Video", Jan. 1998, IEFT, all pages.*
Search Report for EP 05 25 3284, European Patent Office, Oct. 14, 2005.
Slunueli R. et al.: "Effects of frame rate, frame size and MPEG2 compression on the perceived compressed video quality transmitted over lossy IP networks", Information Technology: Research and Education 2004. ITRE 2004. $2^{nd}$ International Conference on London, UK Jun. 28-Jul. 1, 2004, pp. 49-54, XP010771115, ISBN: 0-7803-8625-6.
M. Esteve, et al., "A Video Streaming Application for Urban Traffic Management", Journal of Network and Computer Applications, vol. 30, Issue 2 (Apr. 2007), pp. 479-498 (Abstract).

* cited by examiner

Primary Examiner—Kwang B Yao
Assistant Examiner—Adam Duda
(74) Attorney, Agent, or Firm—Bourque and Associates

(57) ABSTRACT

This invention relates to a non-intrusive video quality assessment system. A method and apparatus are provided in which video frame parameters are extracted from a sequence of packets by generating a first video quality parameter for each group of packets associated with a particular frame of video data in dependence upon the frame rate of the video stream; and generating a second video quality parameter for each of said group of packets in dependence upon the size of encoded data comprising the video frame.

5 Claims, 8 Drawing Sheets

VIDEO QUALITY ASSESSMENT

CROSS-REFERENCE TO RELATED APPLICATION

This application claims priority to European Patent Application No. EP05253284.3, filed May 27, 2005 and incorporated herein by reference in its entirety.

BACKGROUND OF THE INVENTION

This invention relates to a non-intrusive video quality assessment system.

Signals carried over telecommunications links can undergo considerable transformations, such as digitisation, encryption and modulation. They can also be distorted due to the effects of lossy compression and transmission errors.

Objective processes for the purpose of measuring the quality of a signal are currently under development and are of application in equipment development, equipment testing, and evaluation of system performance.

Some automated systems require a known (reference) signal to be played through a distorting system (the communications network or other system under test) to derive a degraded signal, which is compared with an undistorted version of the reference signal. Such systems are known as "intrusive" quality assessment systems, because whilst the test is carried out the channel under test cannot, in general, carry live traffic.

Conversely, non-intrusive quality assessment systems are systems which can be used whilst live traffic is carried by the channel, without the need for test signals.

Non-intrusive testing is required because for some testing it is not possible to use test signals. This could be because the termination points are geographically diverse or unknown. It could also be that the cost of capacity is particularly high on the route under test. Whereas, a non-intrusive monitoring application can run all the time on the live data transmissions to give a meaningful measurement of performance.

A known non-intrusive quality assessment system uses a database of distorted samples which has been assessed by panels of human listeners to provide a Mean Opinion Score (MOS).

MOSs are generated by subjective tests which aim to find the average user's perception of a system's quality by asking a panel a directed question and providing a limited response choice. For example, to determine quality of transmitted coded video users may be asked to rate "the quality of the video" on a five-point scale from Bad to Excellent. The MOS, is calculated for a particular condition by averaging the ratings of all panel members.

In order to train a quality assessment system a sample is parameterised and a combination of the parameters is determined which provides the best prediction of the MOSs indicted by the panel.

Known methods of video quality assessment such as that described in S. Murphy, C. Rambeau, M. Searles, L. Murphy, "Evaluating the Impact of Network Performance on Video Streaming Quality for Categorised Video Content," presented at Packet Video 2004 (PV2004), Irvine, Calif., USA, 13-14 Dec. 2004 consider the effect of packet loss and jitter, or consider the effects of frame rate of bit rate. However, such measures are only able to take into account degradation due to network conditions. It is desirable to use parameters which are able to measure the degradation effect due to the video compression itself. In particular it is desirable to use a parameter which takes into account the temporal and/or the spatial characteristics of a stream of video frames in which each video frame is encoded such that it is represented by one or more packets.

In SLNUELI et al "Effects of frame rate, frame size and MPEG2 compression on the perceived compressed video quality transmitted over lossy tp networks" ISBN 0-7803-8625-6 the relationship between viewer perceived quality and encoding schemes is investigated. The encoding schemes depend upon MPEG compression depth, frame size and frame rate. In this paper the frame size and frame rate are considered prior to coding the data in order to determine an optimal coding scheme.

Both EP 1 530 200 and EP 1433 497 present parameters suitable for use in a quality assessment tool in which parameters are formed over a number of packets ie over a period of time.

SUMMARY OF THE INVENTION

This invention provides such parameters which are useful for assessing video quality over a packet switched telecommunications network.

According to the invention there is provided a method of estimating the quality of a stream of frames of video data wherein said video data is transmitted via a packet switched telecommunications network, and wherein each frame of video data is encoded such that it is represented by one or more packets, the method comprising the steps of: receiving a sequence of packets associated with the stream of frames of video data; extracting a set of parameters from said sequence of packets; and generating an estimated mean opinion score in dependence upon said set of parameters; wherein the generating step comprises the sub steps of: generating a first video quality parameter for each group of packets associated with a particular frame of video data in dependence upon the frame rate of the video stream; and generating a second video quality parameter for each of said group of packets in dependence upon the size of encoded data comprising the video frame.

In a preferred embodiment each packet associated with a particular frame of video data contains a timestamp relating to the temporal position of the frame within the stream and the first video parameter is generated in dependence upon the difference between the timestamp of a group of packets in a sequence of such groups and the timestamp of a previous group in said sequence.

Preferably, the groups of packets are identified in dependence upon the timestamp.

In a preferred embodiment each packet contains an indication of the payload of the packet and the second video parameter is generated in dependence upon the sum of the payloads of the packets in the group.

According to another aspect of the invention there is also provided an apparatus for estimating the quality of a stream of frames of video data wherein said video data is transmitted via a packet switched telecommunications network comprising: means for capturing packet data; means for extracting a set of parameters from said sequence of packets; and means for generating an estimated mean opinion score in dependence upon said set of parameters; characterised in that the means for extracting comprises: means for generating a first video quality parameter for each group of packets associated with a particular frame of video data in dependence upon the frame rate of the video stream; and means for generating a second video quality parameter for each of said group of packets in dependence upon the size of encoded data representing the video frame.

BRIEF DESCRIPTION OF THE DRAWINGS

Embodiments of the invention will now be described, by way of example only, with reference to the accompanying drawings, in which.

DETAILED DESCRIPTION

Figure 1:
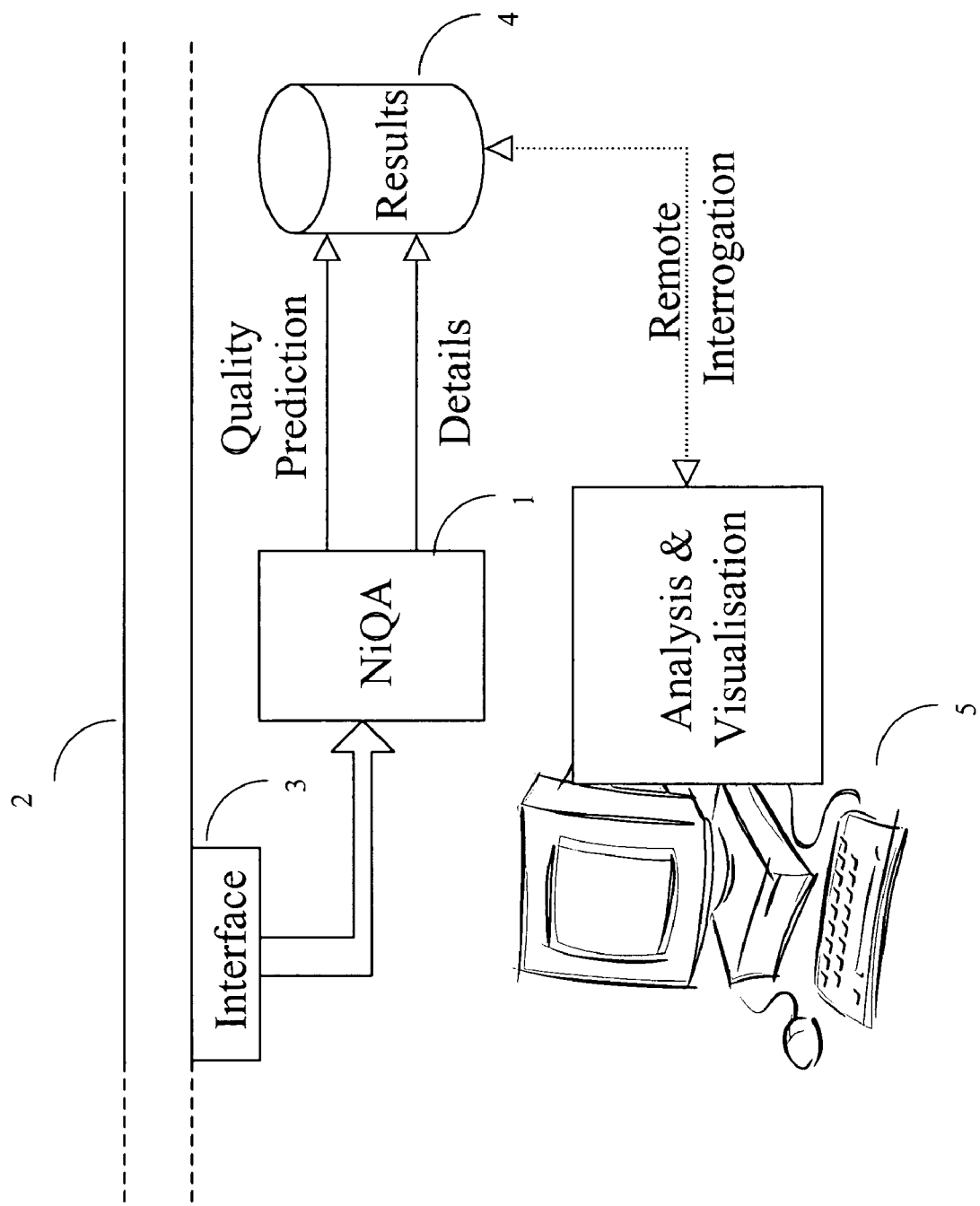
FIG. 1 is a schematic illustration of a non-intrusive quality assessment system.

Referring to FIG. 1, a non-intrusive quality assessment system 1 is connected to a communications channel 2 via an interface 3. The interface 3 provides any data conversion required between the monitored data and the quality assessment system 1. A data signal is analysed by the quality assessment system, as will be described later and the resulting quality prediction is stored in a database 4. Details relating to data signals which have been analysed are also stored for later reference. Further data signals are analysed and the quality prediction is updated so that over a period of time the quality predication relates to a plurality of analysed data signals.

The database 4 may store quality prediction results resulting from a plurality of different intercept points. The database 4 may be remotely interrogated by a user via a user terminal 5, which provides analysis and visualisation of quality prediction results stored in the database 4.

Figure 2:
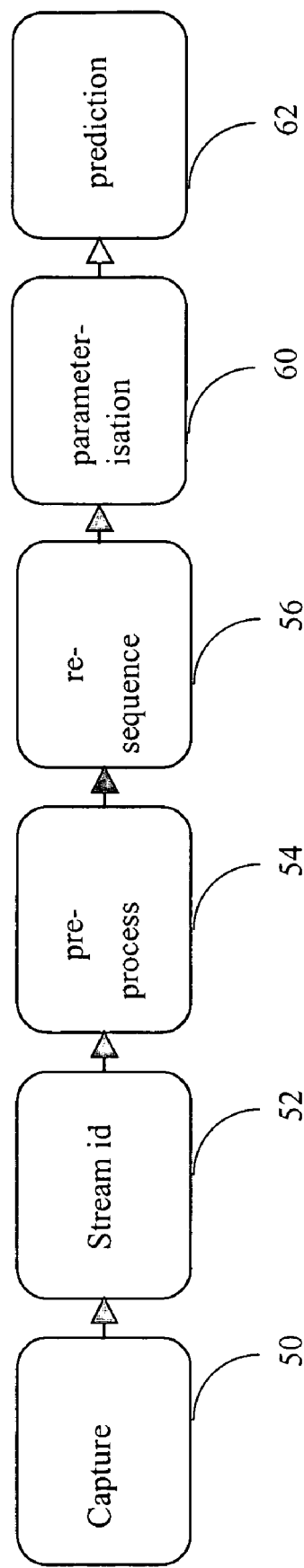
FIG. 2 is a block diagram illustrating functional block of an apparatus for quality assessment.
Figure 2A:
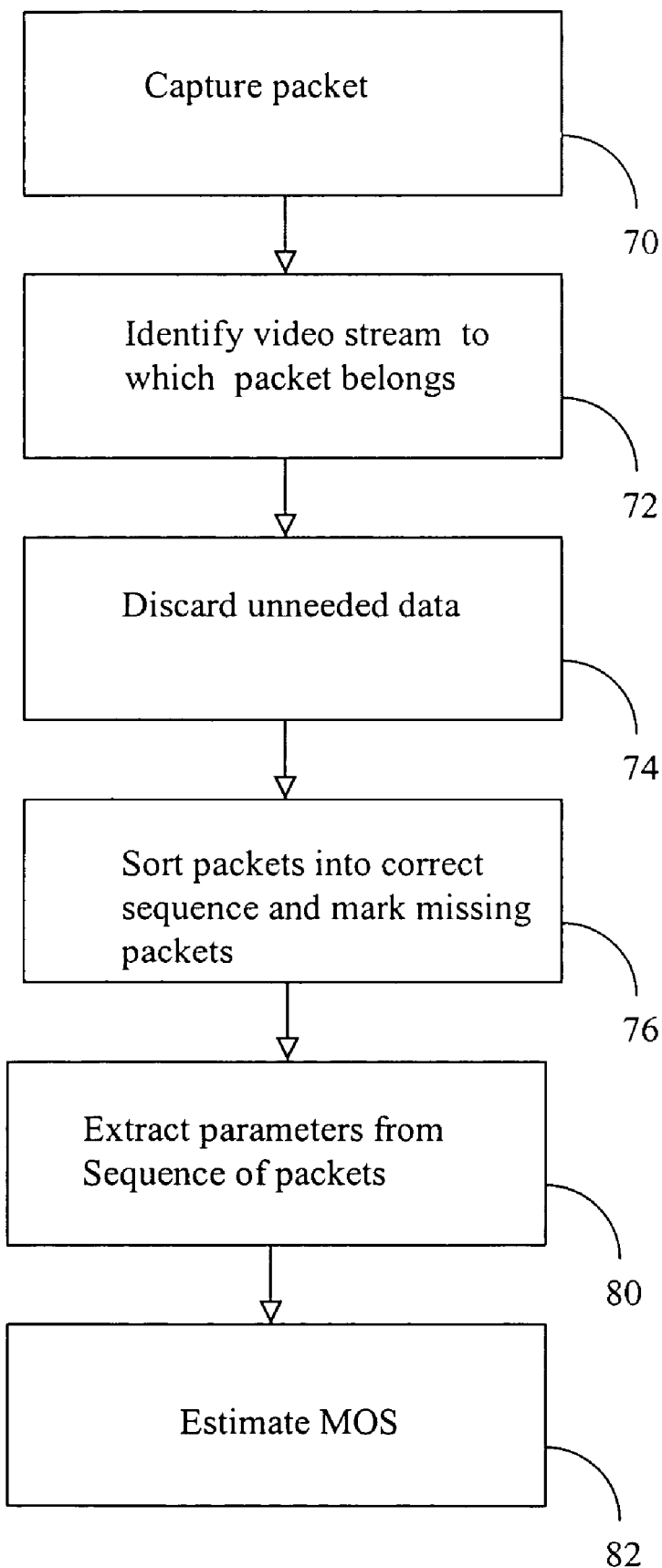
FIG. 2a is a flow chart illustrating the steps carried out by the apparatus of FIG. 4.

FIG. 2 illustrates means for performing a quality assessment process, and FIG. 2a illustrates the method steps to be carried out by the apparatus of FIG. 1.

Capture module 50 at step 70 captures and stores a packet. Any corrupt packets are discarded. A stream identification module 52 identifies to which video stream a captured packet belongs at step 72. A pre-process module 54 discards any information from the captured packet which is no longer needed at step 74, in order to reduce memory and processing requirements for subsequent modules.

A resequence buffer 56 is used to store packet data, and to either pass the data to subsequent modules in sequence, or provide an indication that the data did not arrive at the correct time at step 76. The resequence buffer 56 used in this embodiment of the invention is a simple cyclic buffer.

Parameterisation module 60 extracts parameters from the packet data at step 80 in order to provide a set of parameters which are indicative of the likely MOS for the video signal carried by the sequence of packet data associated with a particular video stream.

A prediction module 62 is then used to predict the MOS at step 82 based on a sequence of parameters received from the parameterisation module 60. A MOS may not be calculated until a predetermined number of packets associated with a particular monitored video stream have been received.

The parameterisation module will now be described with reference to FIGS. 3 to 5.

Parameters are calculated as follows. Every time new packet data is received basic parameters are calculated. These basic parameters are combined over time in various ways to calculate 'level two' parameters. The level two parameters are then used to calculate 'level three' parameters.

Figure 3:
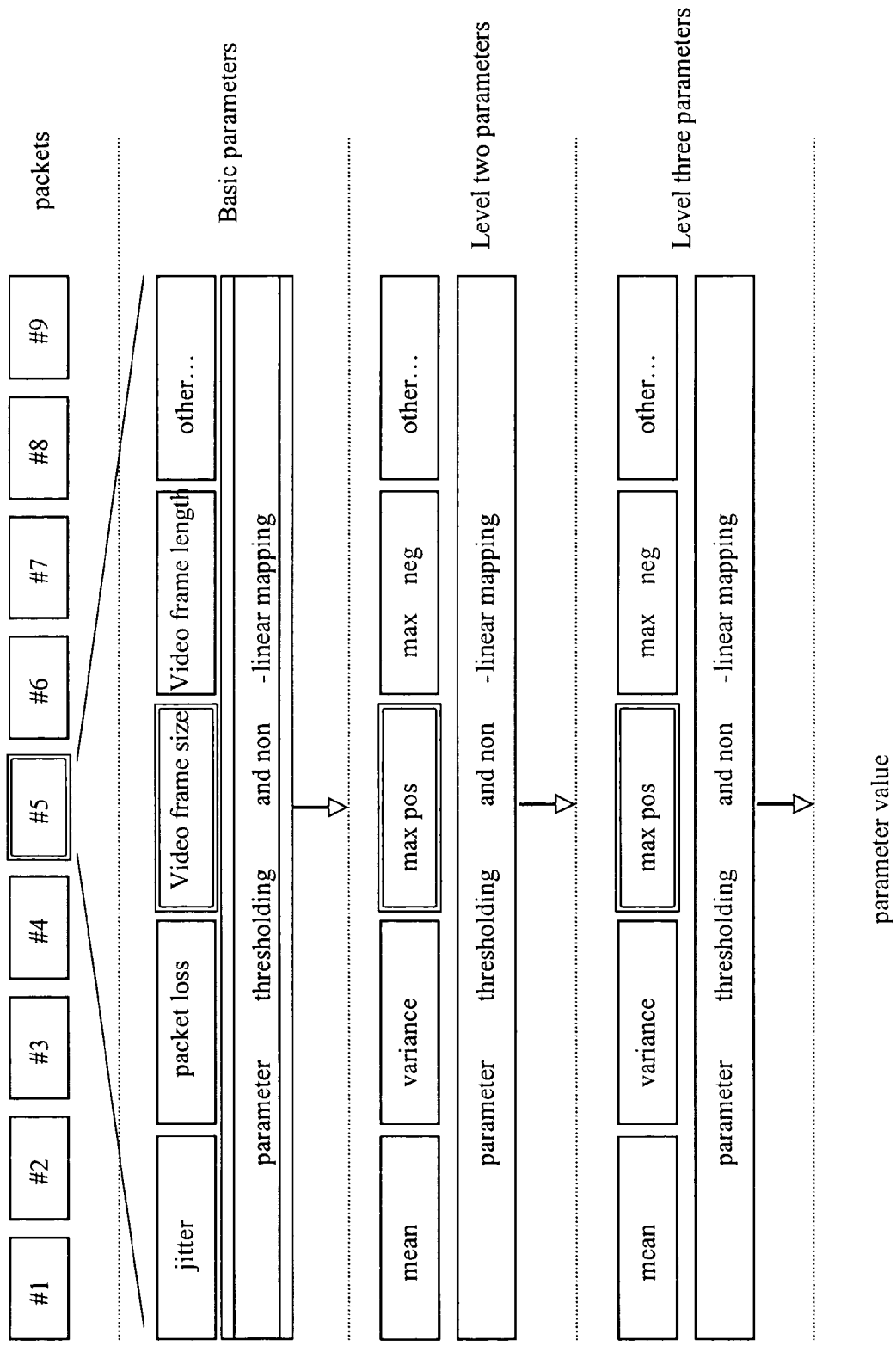
FIG. 3 is an illustration of parameters produced by a parameterisation process.
Figure 3A:
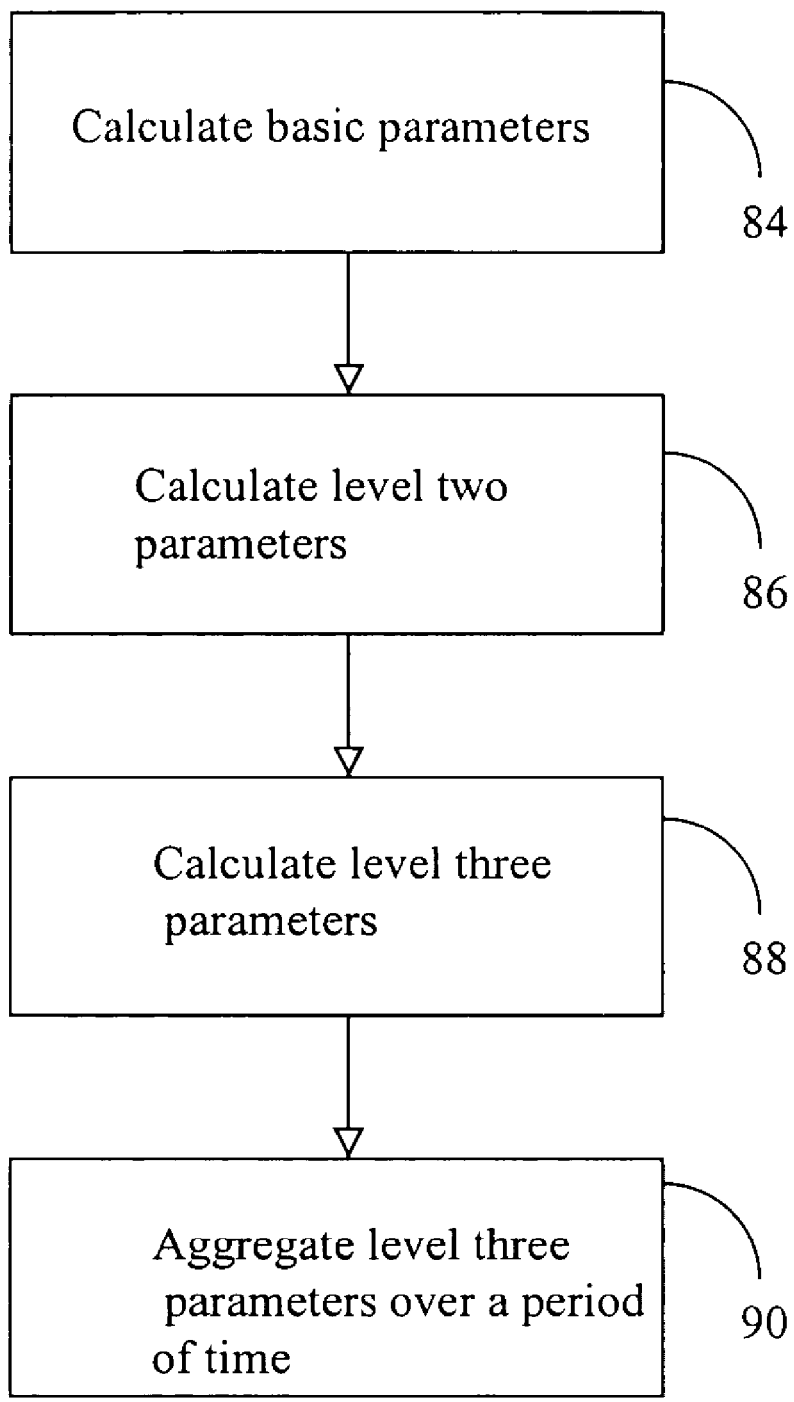
FIG. 3a is a flow chart showing a broad overview of a parameterisation process.

FIG. 3 and FIG. 3a broadly illustrate this process. For example, when packet data (number 5) is received, parameters relating to for example, jitter, packet loss, video frame length, video frame size etc are calculated at step 84. These parameters are combined with previously calculated basic parameters in order to calculate level two parameters such as mean, variance, maximum positive value, maximum negative value, sum, difference, running mean, running variance etc. at step 86.

The level two parameters are combined with previously calculated level two parameters at step 88 in a similar manner to provide level three parameters such as mean, variance, maximum positive value, maximum negative value etc.

Figure 4:
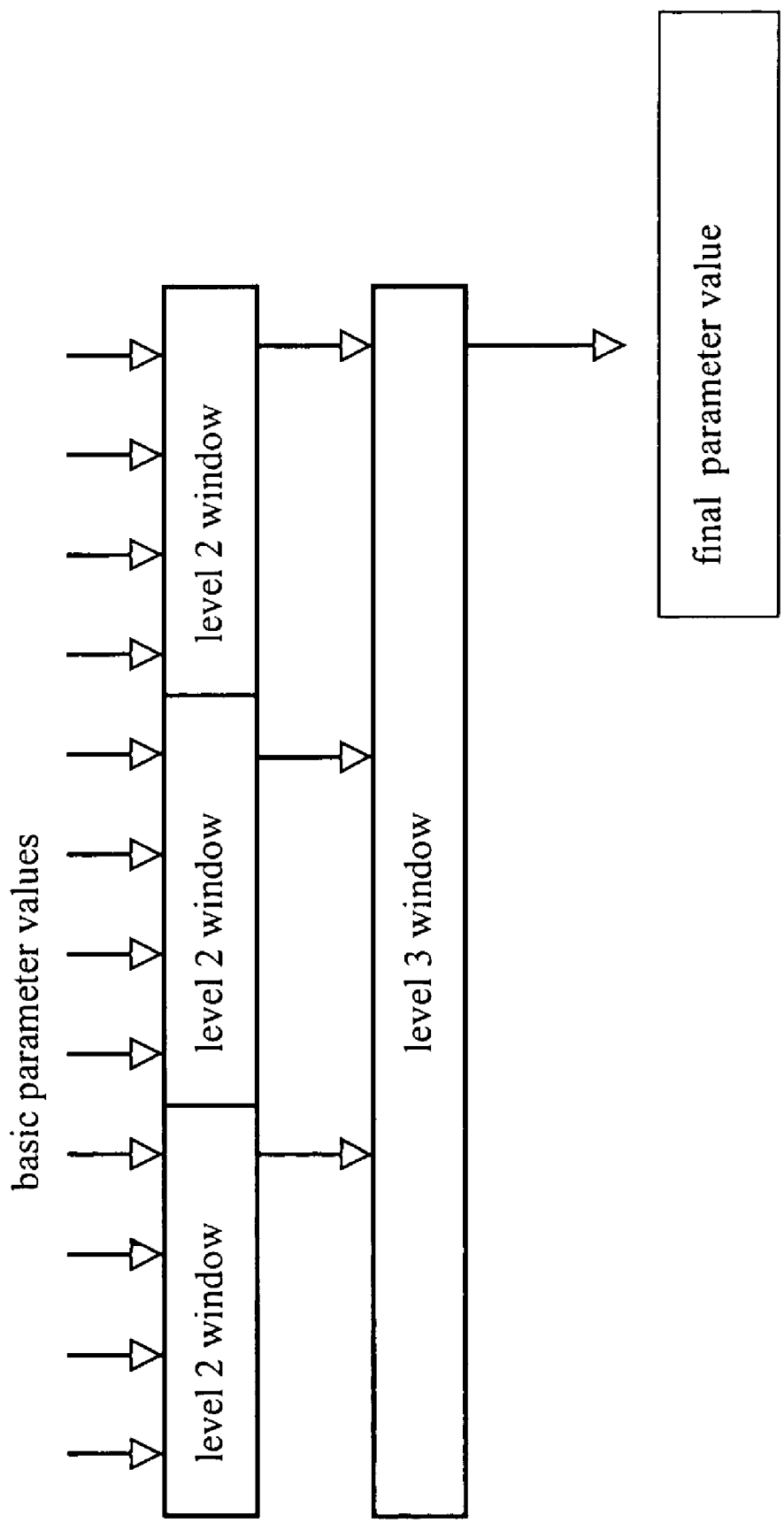
FIG. 4 illustrates combination of parameters at various levels.
Figure 5:
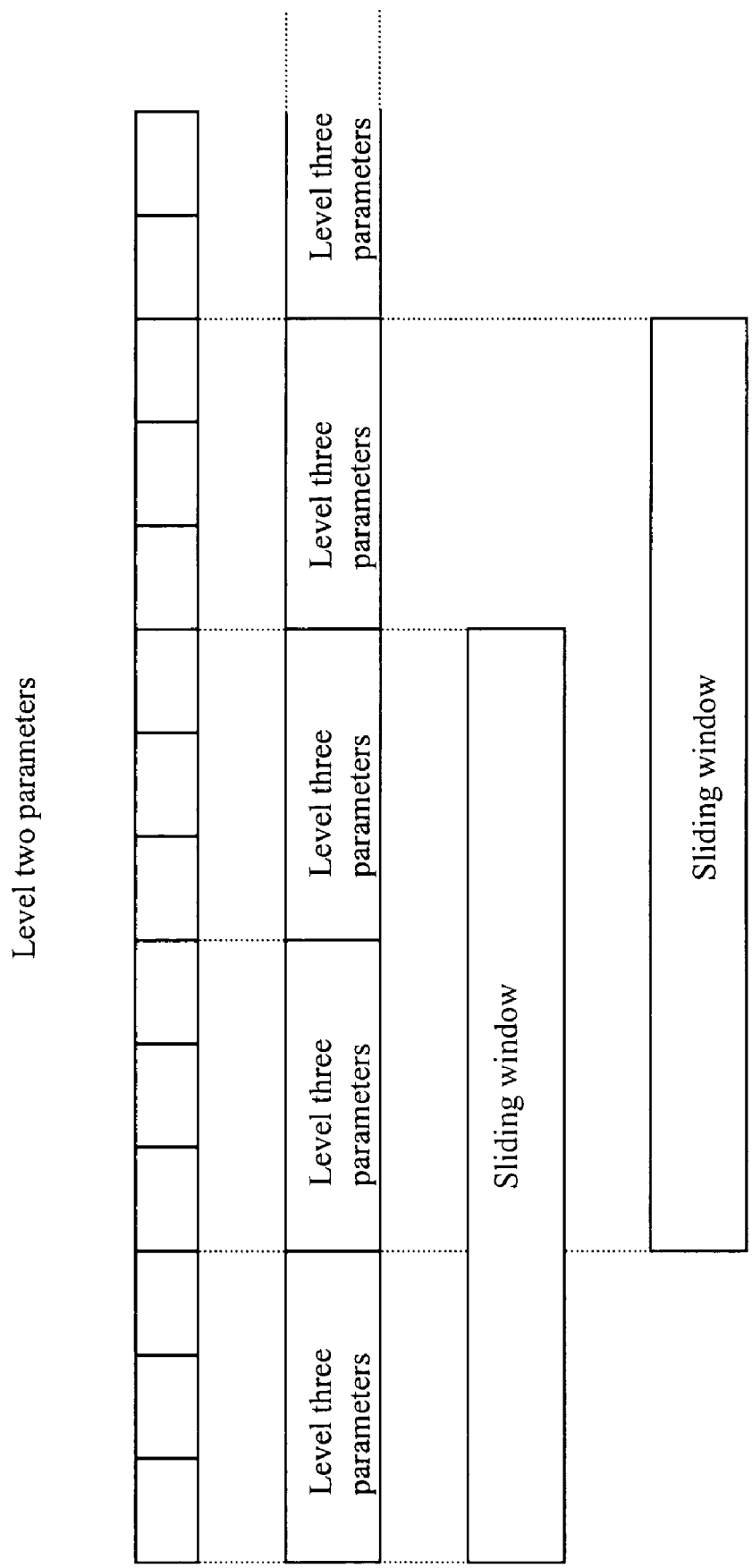
FIG. 5 illustrates use of a sliding window.

FIG. 4 illustrates such combination of parameters to provide a final parameter value at step 88. In the example illustrated four basic parameters are combined to provide each level two parameter, three level two parameters are combined to provide a level three parameter.

Finally the level three parameters are combined using a sliding window mechanism which simply sums a predetermined number of previously calculated level three parameters. This sliding window mechanism is illustrated in FIG. 5, where the sliding window sums the previous three level three parameters.

Video data comprises a stream of frames, each frame of video data represents an image at a particular point in time. Each frame of video data is represented by one or more video data packets. It has been found to be advantageous to generate a temporal parameter (Video Frame Length) dependent upon the frame rate of the video data as well as a spatial parameter (Video Frame Size) based on the frame size of the video data. Because the video data is represented by a one or more packets of data it is necessary to consider groups of packets which are associated with a particular frame of video data in order to generate a Video Frame Size and Video Frame Length parameter relating to each video frame (or group of packets).

Each packet contains a timestamp which is in indication of the temporal position of the associated video frame within the stream of video data. Therefore packets associated with the same frame of video data will have the same timestamp, and the timestamp can be used to identify packets associated with a particular video frame.

Figure 6:
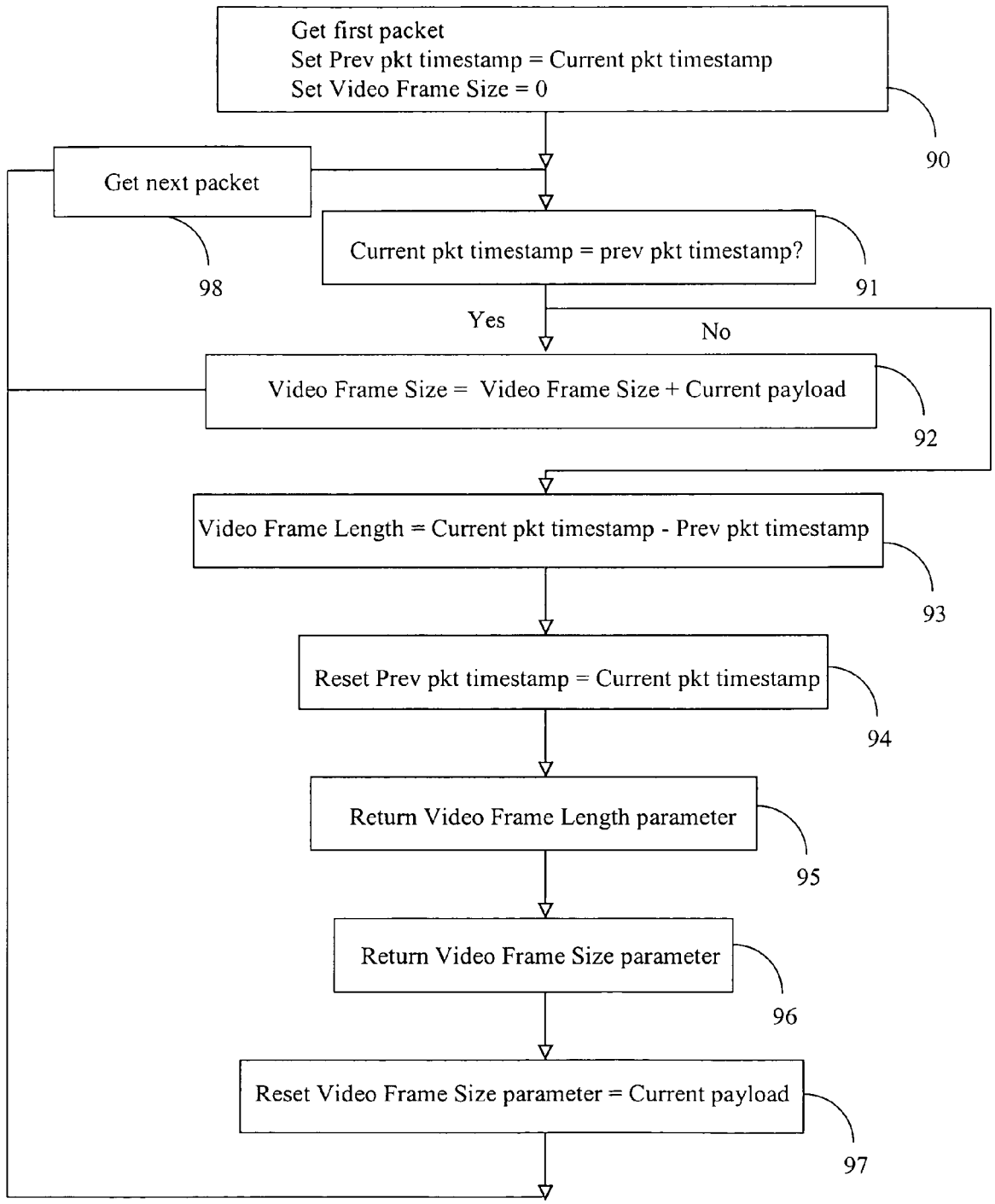
FIG. 6 is a flow chart illustrating calculation of particular parameters.

The calculation of the basic parameters Video Frame Length and Video Frame Size will now be described with reference to FIG. 6 which illustrates part of the basic parameterisation of step 84.

At step 90 the first packet is received and the variables Prev pkt timestamp and Video Frame Size are set to initial values. At step 91 the timestamp of the current packet is compared to Prev pkt timestamp. If they are the same then either this is the first packet or it is another packet associated with the same video frame as a previously received packet. Therefore the Video Frame Size parameter is increased by the amount of the payload of the current packet at step 92. If the Current timestamp is not the same as Prev pkt timestamp, then this packet is the first packet associated with the next video frame. Therefore at step 93 the parameter Video Frame Length is calculated in dependence up the difference between the current timestamp and the previously stored timestamp and at step 94 Prev pkt timestamp is reset to be equal to the current timestamp.

The two parameters are returned for use by the prediction module 62 at steps 95 and 96 respectively, and at step 97 the Video Frame Size parameter is set to be equal to the current payload.

At step 98 the next packet is considered, and steps 91 to 97 are repeated.

As discussed above the parameters Video Frame Length and Video Frame Size are combined with other basic parameters such as packet loss and jitter by the prediction module 60 to produce a Mean Opinion Score. Level two and level three parameters such as maximum, variance, average, Minowski distance, etc may also be used.

It will be understood by those skilled in the art that the processes described above may be implemented on a conventional programmable computer, and that a computer program encoding instructions for controlling the programmable computer to perform the above methods may be provided on a computer readable medium.

It will also be understood that various alterations, modifications, and/or additions may be introduced into the specific embodiment described above without departing from the scope of the present invention.

We claim:

1. A method of estimating a quality of a stream of frames of video data wherein said video data is transmitted via a packet switched telecommunications network, and wherein each frame of video data is encoded such that it is represented by one or more packets, each packet having a payload, the method comprising the steps of:

receiving, by a quality assessment system coupled to said packet switched telecommunications network, a sequence of packets associated with the stream of frames of video data;

responsive to receiving said sequence of packets associated with the stream of frames of video data, extracting, by said quality assessment system, a set of parameters from said sequence of packets, and wherein said set of parameters includes a first video quality parameter and a second video quality parameter; and responsive to extracting said set of parameters from said sequence of packets, generating, by said quality system, an estimated mean opinion score based upon said set of parameters; wherein the generating step further comprises the steps of:

generating, by said quality assessment system, said first video quality parameter for each group of packets associated with a particular frame of video data based upon a determined frame duration of the particular frame of video data in the stream of video data; and generating, by said quality assessment system, said second video quality parameter for each of said group of packets in dependence upon the size of encoded data comprising the particular frame of said video data, wherein each packet associated with a particular frame of video data contains a timestamp relating to a temporal position of the particular frame within the stream of video data and in which the first video parameter is generated in dependence upon the difference between the timestamp of a group of packets in a sequence of such groups and the timestamp of a previous group in said sequence of packets associated with the stream of frames of video data.

2. The method according to claim 1, in which the groups of packets are identified in dependence upon the timestamp.

3. The method according to claim 1, in which each packet contains an indication of the payload of the packet and in which the second video parameter is generated in dependence upon the sum of the payloads of the packets in the group.

4. An apparatus for estimating a quality of a stream of frames of video data wherein said video data is transmitted via a packet switched telecommunications network in a sequence of packets, said apparatus comprising:

means for capturing packet data;

means for extracting a set of parameters from said sequence of packets; and means for generating an estimated mean opinion score in dependence upon said set of parameters;

characterised in that the means for extracting comprises:

means for generating a first video quality parameter for each group of packets associated with a particular frame of video data in dependence upon a determined frame duration of the particular frame in the stream of video data; and means for generating a second video quality parameter for each of said group of packets in dependence upon a size of encoded data comprising the particular frame in the stream of video data, and wherein said set of parameters includes said first video quality measurement and said second video quality measurement, wherein each packet associated with a particular frame of video data contains a timestamp relating to a temporal position of the particular frame within the stream of video data and in which the first video parameter is generated in dependence upon the difference between the timestamp of a group of packets in a sequence of such groups and the timestamp of a previous group in said sequence of packets associated with the stream of frames of video data.

5. A computer readable medium embodied with a computer program for implementing the method according to claim 1.

* * * * *